May 4, 1965 G. WOLFF 3,182,305

VERNIER DIGITAL ENCODER

Filed Feb. 15, 1962

2 Sheets-Sheet 1

INVENTOR.

Gunther Wolff

INVENTOR.
Gunther Wolff

United States Patent Office 3,182,305

Patented May 4, 1965

3,182,305

VERNIER DIGITAL ENCODER

Gunther Wolff, Westport, Conn., assignor to Machine Tool Automation, Inc., Southport, Conn., a corporation of Connecticut Filed Feb. 15, 1962, Ser. No. 173,585
8 Claims. (Cl. 340—347)

This invention relates to apparatus capable of transducing a mechanical positional quantity into a quantized and/or coded electrical signal, commonly referred to as a "digital encoder." More specifically, this invention relates to a new and improved digital encoder in which the electrical quanta can be made extremely small, thus permitting very high resolution.

In a digital encoder, a movable member is displaced in relation to a stationary member; further, the stationary member is capable of distinguishing two (or possibly some other finite number) states of the movable member, e.g., magnetically high or low reluctance, optically translucent or opaque, electrically conducting or insulating, etc. The movable member, in turn, is composed of a series of these alternating areas which are in either of the above states. It has been past practice for the output from the stationary member to change electrical state (e.g., from 10 volts to 0 volts), i.e., produce an electrical quantum whenever there was a change in state of the movable member. In other words, in the prior art the total number of electrical output quanta produced is equal to the total number of distinguishing areas on the code track.

As an attempt is made to increase the resolution of the encoder, the width of each quantum on the code track becomes increasingly less, and eventually two major limitations preclude any further reduction in quantum width, viz., difficulties in manufacturing such extremely fine gratings, and boundary problems for the sensing means in the stationary member.

It is therefore an object of this invention to provide a high resolution encoder in which the width of the alternating areas of the code track may be made many quanta wide, so as to minimize manufacturing difficulties.

It is a further object of this invention to provide a high resolution encoder in which the sensing means changes rapidly from one state to the other in response to a change in the movable member.

These objects of the invention are achieved by providing a series of heads spaced in accordance with the vernier principle, and constructed in accordance with the differential variable reluctance transformer principle or other differential sensing techniques.

The above, as well as other objects and novel features of the invention will become apparent from the following specification and accompanying drawings in which.

Figure 1:
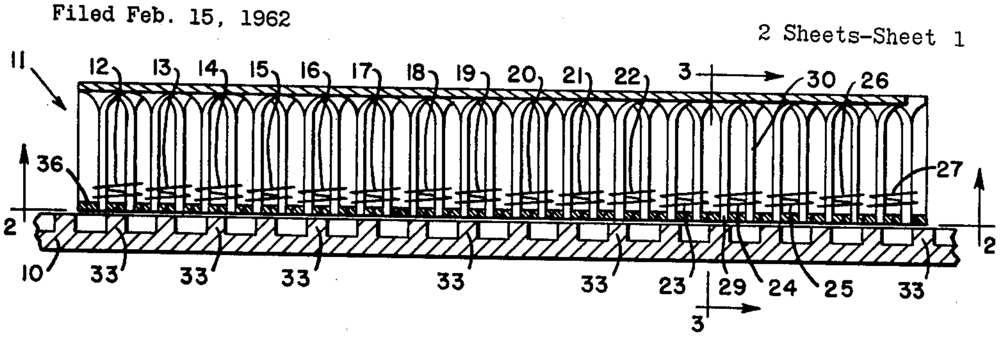
FIG. 1 is a partially sectional elevational view of a vernier digital encoder to which some of the principles of the invention have been applied.
Figure 2:
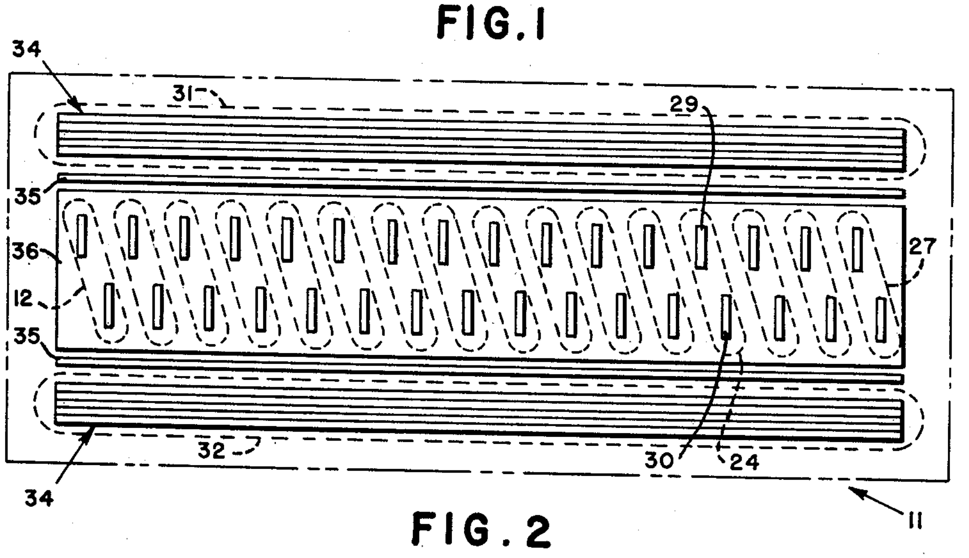
FIG. 2 is a bottom view of the head portion of the encoder, taken along line 2—2 of FIG. 1.

Referring to the drawings, and particularly to FIG. 1, some of the principles of the invention are shown as applied to a digital encoder, including a movable codified track member 10 and a stationary head assembly 11. In the particular configuration shown, the track and head assembly is flat, suitable for encoding a linear displacement. It is, of course, within the scope of this invention to form track and heads in a round fashion, thus permitting the encoding of angular displacements.

Figure 3:
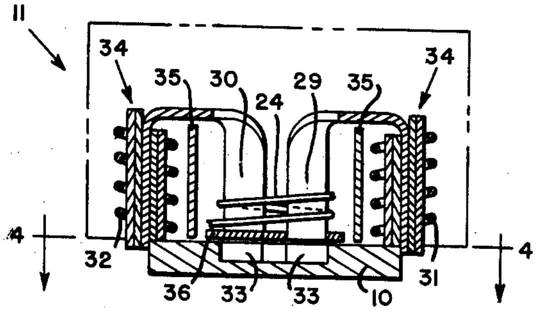
FIG. 3 is a sectional view, taken along line 3—3 of FIG. 1.
Figure 4:
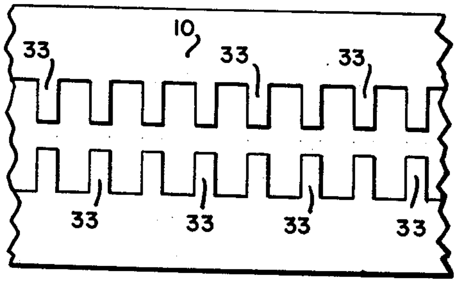
FIG. 4 is a top view of the code track, taken substantially along line 4—4 of FIG. 3.

The head assembly 11 is composed of a plurality of individual Differential Flux Variable Reluctance Transformers 12–27. Reference to FIG. 3 will disclose the principle of operation of said DFVRT's. The pick-off coil 24 surrounds two magnetic pole pieces 29 and 30. If then an alternating flux is caused to flow in these pole pieces, a voltage will be induced in the pick-off coil proportional to the number of flux linkages, i.e., the number of lines of magnetic flux. A separate source of magnetomotive force is provided for each pole piece, viz., exciting coils 31 and 32. (Exciting coils 31 and 32 are common to all sixteen pick-off coils.) The polarities of these mmf.'s, however, are such as to cause the respective fluxes in poles 29 and 30 to flow in opposite directions, thus yielding an output voltage in pick-off coil 24 which is proportional to the difference of fluxes in poles 29 and 30. The flux in these poles will be quite low unless the iron circuit back to the exciting coil is completed; this is achieved by means of the soft iron armatures 33 in the movable code track 10. In other words, when the bottom end of a pole 29 or 30 is centered over a raised portion 33 of track 10, the magnetic flux will be a maximum; and when it is centered over the space between raised portions 33, the magnetic flux will be a minimum. Since the magnetic flux flows oppositely in poles 29 and 30 for each DFVRT, when said poles are centered, respectively, over a raised portion 33 and a space between such portions, the signal developed in its pick-off coil is a maximum having one polarity; and when they are centered, respectively, over a space between raised portions 33 and over a raised portion, the signal in its pick-off coil is also maximum but of opposite polarity.

The diagonal arrangement of poles 29, 30 locates those of each DFVRT over a raised portion 33 and a next adjacent space between raised portions simultaneously. As the track 10 moves, this relationship of poles 29, 30 remains the same relative to each other. Thus, as the code track is moved past the individual head, the net flux linking with the coil will be constant and of one polarity until suddenly it changes through zero to the opposite polarity, remaining constant for approximately another half pitch, and then rapidly rising back to the original polarity again. This process is repeated again and again. An A.-C. voltage is generated in the pick-off coil and its magnitude is constant except for a sharp V-notch occasioned by the voltage passing through null as explained above.

It will be obvious to those skilled in the art that other differential sensing techniques can be readily substituted for the magnetic technique described in detail above. Thus, for instance, two photo cells could be made to look at a glass slide with alternately opaque and translucent areas. A pair of conductive probes could either resistively or capacitively be arranged in conjunction with a code track composed of electrically conductive or insulating areas. Radiation-sensitive heads could be arranged over a lead plate, etc.

If the distance between the leading edges of successive raised portions 33 is "$x$," then the distance between corresponding successive edges of the poles 20 is $x+x/32$. As previously described, the pole 30 of each DFVRT is diagonally arranged and they, too, are spaced in the same fashion relative to each other as are the poles 29.

This construction of poles 29, 30 and raised portions 33 of track 10 provides a vernier arrangement so that a null signal occurs in succeeding pick-off coils of the DFVRT's 12 to 27 for each incremental movement of the scale 10 that equals 1/32 of the distance between the leading edge of two adjacent raised portions 33. Consequently, if the distance is .032", a value capable of being readily produced, nulls will occur in succeeding DFVRT's 12 to 27 for each 0.001 of an inch of movement of scale 10.

As noted above, the exciting coils 31 and 32 are common to all pick-off coils. This construction not only simplifies the mechanical design, but it serves the additional purpose of tending to keep the input impedance constant and independent of movement of the code track since the net reluctance seen by the primary mmf. remains essentially constant.

An ever-present problem with variable reluctance devices is the "leakage" flux that links with the pick-off coil even when the controlling magnetic circuit has been opened. In the particular device of the present invention, the leakage flux passes from the sides of the pole pieces 29 and 30 either to the code track 10 or to the iron structure 34 surrounding the exciting coils 31 and 32. Conductive plates 35 reduce this flux by eddy current action, as does conductive plate 36. Plate 36 serves the additional purpose of accurately locating the tips of pole pieces 29 and 30.

Figure 5:
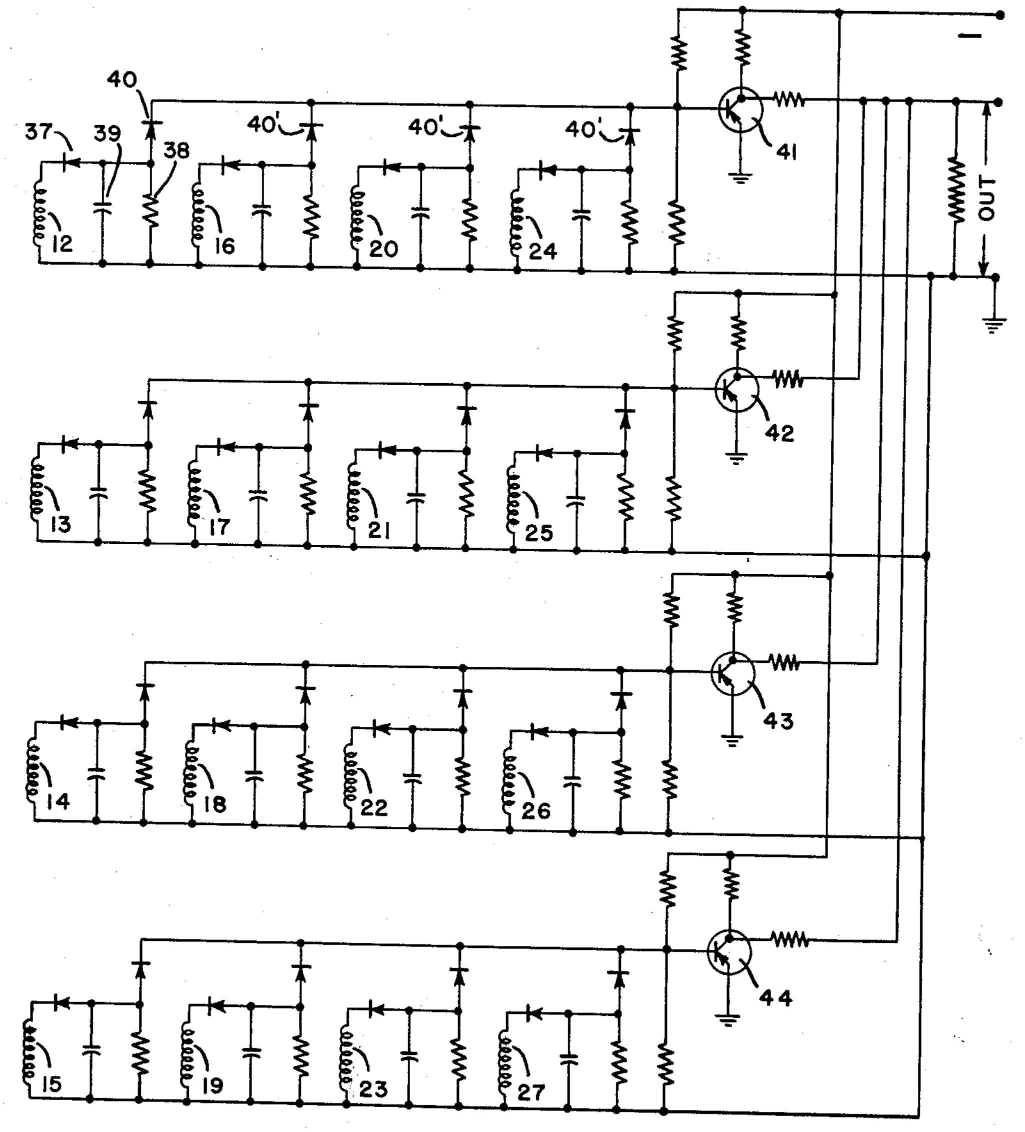
FIG. 5 shows a circuit that may be used in conjunction with the encoder for logically combining the signals from various heads.

The series of electrical output pulses produced as the code track is moved past the head assembly can be converted into a binary pulse train for a so-called "incremental" encoder, or, by the use of several heads with different pulse distances, into a "whole number" or "absolute" encoder. Reference to FIG. 5 shows a circuit which may be employed to summate the outputs from sixteen (in the example shown) coils, to result in a single output with an alternate binary "zero" or "one" at a frquency corresponding to one-half the pulse distance. In the circuit shown in FIG. 5, the outputs from every fourth coil are first summed, and only then, after amplification, all sixteen outputs are combined. As an alternate, the individual coils may be summed directly before amplification in the manner shown for each group of coils, e.g., 12, 16, 20 and 24. The principle of operation of this circuit will become apparent from an examination of a single coil circuit. The A.-C. output of coil 12 is rectified by diode 37 and applied across resistor 38 and capacitor 39. The presence of this D.-C. voltage at diode 40 blocks the base current to the transistor 41. Thus the transistor will have an output only when the coil 12 has zero or very low output, which occurs every time when the code track is moved through its particular pulse distance. But each of the coils 16, 20 and 24 also contributes a transistor output for their respective pulse distances. (A "sneak circuit" between coils is blocked by the action of diodes 40'.) The outputs from transistors 41, 42, 43 and 44 may now be summed in the conventional manner to produce a single output with a binary one occurring every time that any one of coils 12–27 traverses through its pulse distance. The resultant device is an "incremental" encoder.

In another form of the invention, the pick-off head outputs are logically combined to result in a "whole number" encoder. From the above it becomes apparent that the pulse distance can be adjusted by means of the triggering point of the associated transistor. If then a second head assembly is placed on the same track, with double the pitch distance of the first head assembly, and if the transistor be adjusted for also double the pulse distance of the first head, then this second head will produce a binary number of one higher order of significance than the first head. By repeating the process of increased pitch distances and higher transistor triggering voltages, a "whole number" encoder can be built using only a single track.

What is claimed is:

1. In a digital shaft encoder, a codified member in which the distinguishing areas are more than one quantum wide; and an associated reading head comprised of a plurality of individual sensors each capable only of being in either a digitally "on" or "off" state, with the "on" state obtaining only when said sensor is centered on a distinguishing area of said codified member, said plurality of sensors being spaced at the pitch distance of the codified member plus two quanta.

2. In a digital shaft encoder, a codified member in which the distinguishing areas are more than one quantum wide; and an associated reading head comprised of a plurality of magnetic differential sensing devices in which the output is proportional to the algebraic sum of the fluxes in two pole pieces, the flux in said pole pieces being responsive to the change in reluctance of the completing magnetic circuit as a result of mechanical motion of a portion of said completing magnetic circuit, each of said sensors being capable only of being in either a digitally "on" or "off" state, with the "on" state obtaining only when said sensor is centered on a distinguishing area of said codified member, and said plurality of sensors being spaced at the pitch distance of the codified member plus two quanta.

3. In a digital shaft encoder, a codified member in which the distinguishing areas are more than one quantum wide; and an associated reading head comprised of a plurality of individual sensors, each comprised of two opposing sensing means, said sensor being responsive only to the algebraic sum of the outputs from each opposing sensing means, each of said sensors being capable only of being in either a digitally "on" or "off" state, with the "on" state obtaining only when said sensor is centered on a distinguishing area of said codified member, and said plurality of sensors being spaced at the pitch distance of the codified member plus two quanta.

4. In a digital shaft encoder, a codified member in which the distinguishing areas are more than one quantum wide; and an associated reading head comprised of a plurality of individual sensors each capable only of being in either a digitally "on" or "off" state, with the "on" state obtaining only when said sensor is centered on a distinguishing area of said codified member, said plurality of sensors being spaced at the pitch distance of the codified member plus two quanta, and said reading head comprising a magnetic circuit structure such that the total reluctance opposing the primary flux remains essentially constant and independent of relative displacements between said head and codified member.

5. In a digital shaft encoder, a codified member in which the distinguishing areas are more than one quantum wide; and an associated reading head comprised of a plurality of individual sensors, each comprised of two opposing sensing means, said sensor being responsive only to the algebraic sum of the outputs from each opposing sensing means, each of said sensors being capable only of being in either a digitally "on" or "off" state, with the "on" state obtaining only when said sensor is centered on a distinguishing area of said codified member, said plurality of sensors being spaced at the pitch distance of the codified member plus two quanta, and said reading head comprising a magnetic circuit structure such that the total reluctance opposing the primary flux remains essentially constant and independent of relative displacements between said head and codified member.

6. In a digital shaft encoder, a codified member in which the distinguishing areas are more than one quantum wide; and an associated reading head comprised of a plurality of magnetic differential sensing devices in which the output is proportional to the algebraic sum of the fluxes in two pole pieces, the flux in said pole pieces being responsive to the change in reluctance of the completing magnetic circuit as a result of mechanical motion of a portion of said completing magnetic circuit, each of said sensors being capable only of being in either a digitally "on" or "off" state, with the "on" state obtaining only when said sensor is centered on a distinguishing area of said codified member, said plurality of sensors being spaced at the pitch distance of the codified member plus two quanta, and said two pole pieces being rendered relatively insensitive to magnetomotive forces, other than the desirable magnetomotive force existing in the iron magnetic circuit through the mechanically movable armature, by means of a conductive eddy current shield placed adjacent to the pick-off coil surrounding said two pole pieces.

7. In a digital shaft encoder, a codified member in which the distinguishing areas are more than one quantum wide; an associated reading head comprised of a plurality of magnetic differential sensing devices in which the output is proportional to the algebraic sum of the fluxes in two pole pieces, the flux in said pole pieces being responsive to the change in reluctance of the completing magnetic circuit as a result of mechanical motion of a portion of said completing magnetic circuit, each of said sensors being capable of yielding an output only when said sensor is centered on a distinguishing area of said codified member, and said plurality of sensors being spaced at the pitch distance of the codified member plus two quanta; a read-out circuit comprising for each sensor coil a diode; a load consisting of a resistor with associated smoothing capacitor, the output across said load being paralleled with the outputs from other sensor coils through a blocking diode; and a common emitter transistor circuit with its base so connected to the paralleled output from the coils that the transistor will be turned on only when the base bias voltage is high enough to overcome the output voltage from any one sensor coil.

8. In a digital shaft encoder, a codified member in which the distinguishing areas are more than one quantum wide; an associated reading head comprised of a plurality of magnetic differential sensing devices in which the output is proportional to the algebraic sum of the fluxes in two pole pieces, the flux in said pole pieces being responsive to the change in reluctance of the completing magnetic circuit as a result of mechanical motion of a portion of said completing magnetic circuit, each of said sensors being capable of yielding an output only when said sensor is centered on a distinguishing area of said codified member, and said plurality of sensors being spaced at the pitch distance of the codified member plus two quanta; a read-out circuit comprising for each sensor coil a diode; a load consisting of a resistor with associated smoothing capacitor, the output across said load being paralleled with the outputs from said sensor coils through a blocking diode; a common emitter transistor circuit with its base so connected to the paralleled output from the coils that the transistor will be turned on only when the base bias voltage is high enough to overcome the output voltage from any one sensor coil; and a plurality of reading heads provided with pitch distances and output discrimination so adjusted that the outputs from successive heads on the same codified member yield binary numbers of increasing significance.

References Cited by the Examiner

UNITED STATES PATENTS

| | | | |
|---|---|---|---|
| 2,905,874 | 9/59 | Kelling | 340—347 |
| 2,918,535 | 12/59 | Wiegand | 340—174.1 |

MALCOLM A. MORRISON, *Primary Examiner.*